United States Patent [19]
Ebihara et al.

[11] Patent Number: 5,115,320
[45] Date of Patent: May 19, 1992

[54] APPARATUS FOR EDITING AND PRINTING A VIDEO IMAGE

[75] Inventors: Toshiyuki Ebihara, Hachioji; Satoru Sakai, Ooi; Masaji Nishikawa, Hachioji; Masashi Asano, Tokyo, all of Japan

[73] Assignee: Olympus Optical Co., Ltd., Tokyo, Japan

[21] Appl. No.: 583,949

[22] Filed: Sep. 14, 1990

[30] Foreign Application Priority Data

Sep. 20, 1989 [JP] Japan .................. 1-244602
Sep. 29, 1989 [JP] Japan .................. 1-253933

[51] Int. Cl.⁵ .................. H04N 1/21; H04N 1/04
[52] U.S. Cl. .................. 358/296; 358/450; 358/451; 358/452; 358/453
[58] Field of Search .............. 358/296, 434, 440, 450, 358/451, 452, 453

[56] References Cited

U.S. PATENT DOCUMENTS

| 4,342,052 | 7/1982 | Rackley et al. | 358/451 X |
| 4,538,183 | 8/1985 | Kanno et al. | 358/451 X |
| 4,558,374 | 12/1985 | Kurata et al. | 358/451 X |
| 4,667,248 | 5/1987 | Kanno | 358/451 X |
| 4,870,503 | 9/1989 | Miura | 358/434 |
| 4,893,194 | 1/1990 | Sakata | 358/451 X |
| 4,896,208 | 1/1990 | Moriya et al. | 358/450 X |

FOREIGN PATENT DOCUMENTS

| 3639029 | 11/1976 | Fed. Rep. of Germany . |
| 3421445 | 6/1984 | Fed. Rep. of Germany . |
| 3421446 | 6/1984 | Fed. Rep. of Germany . |
| 3421512 | 6/1984 | Fed. Rep. of Germany . |
| 3905840 | 2/1989 | Fed. Rep. of Germany . |

OTHER PUBLICATIONS

Color Image Printer and Color Output System, Tektronix TEK 4693D/4693DS, copyright 1987.

Primary Examiner—Benjamin R. Fuller
Assistant Examiner—Eric Frahm
Attorney, Agent, or Firm—Frishauf, Holtz, Goodman & Woodward

[57] ABSTRACT

A video printing apparatus of the present invention includes a unit for converting an input image signal to a digital signal through an A/D conversion, memory units for storing the digital signal, memory unit for storing a printing image area in an edited format, operation section for generating an address signal corresponding to a given formed dither image area and control circuit. When printing of an image is designated for one image area, a corresponding input image signal is taken out and printed on a printing sheet by a recording head. When, on the other hand, printing of an image is designated for a plurality of image areas, designated dither image areas are trimmed and edited by the memory unit into one image. The resultant image is printed, by the recording head, on the printing sheet.

4 Claims, 19 Drawing Sheets

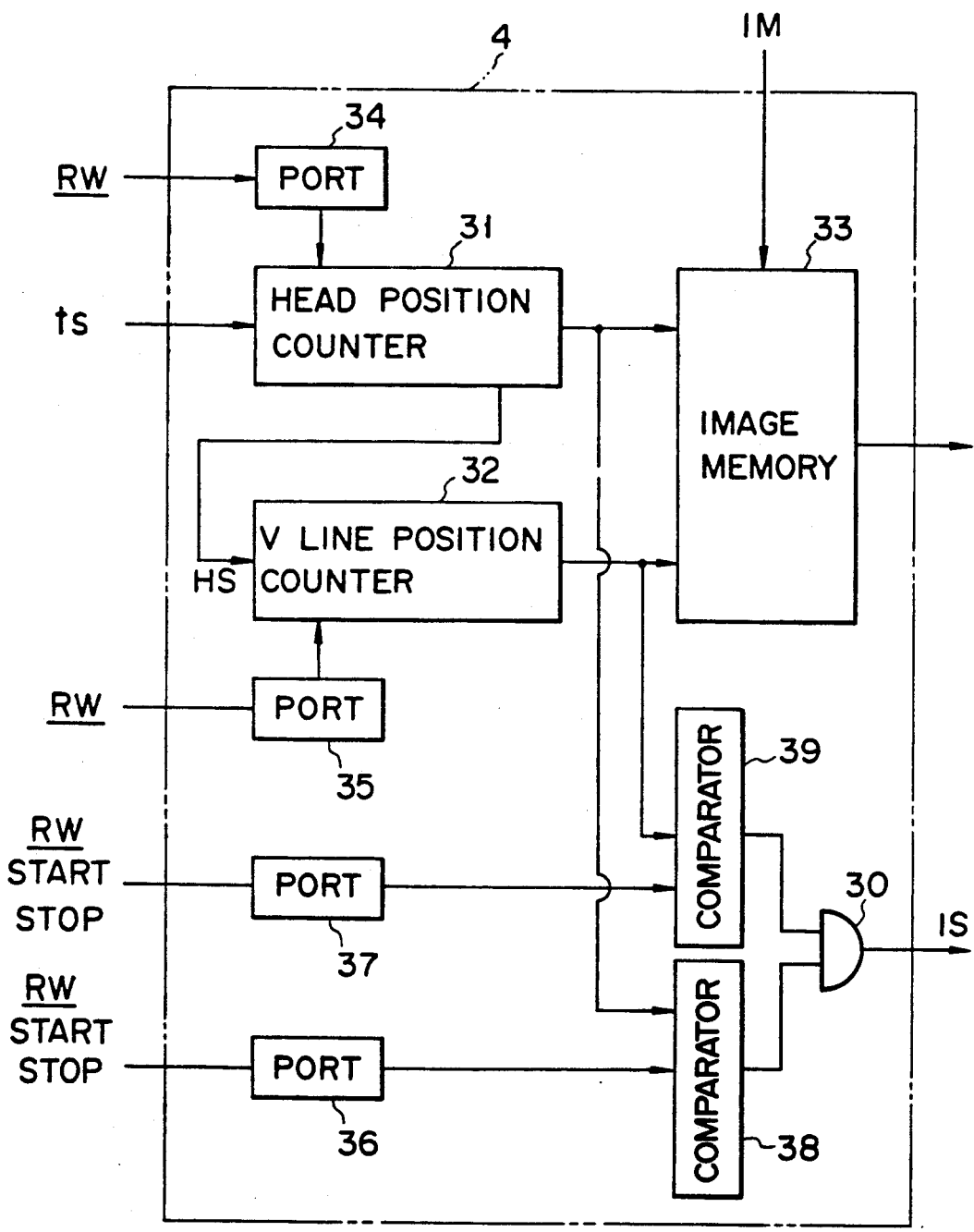
F I G. 3

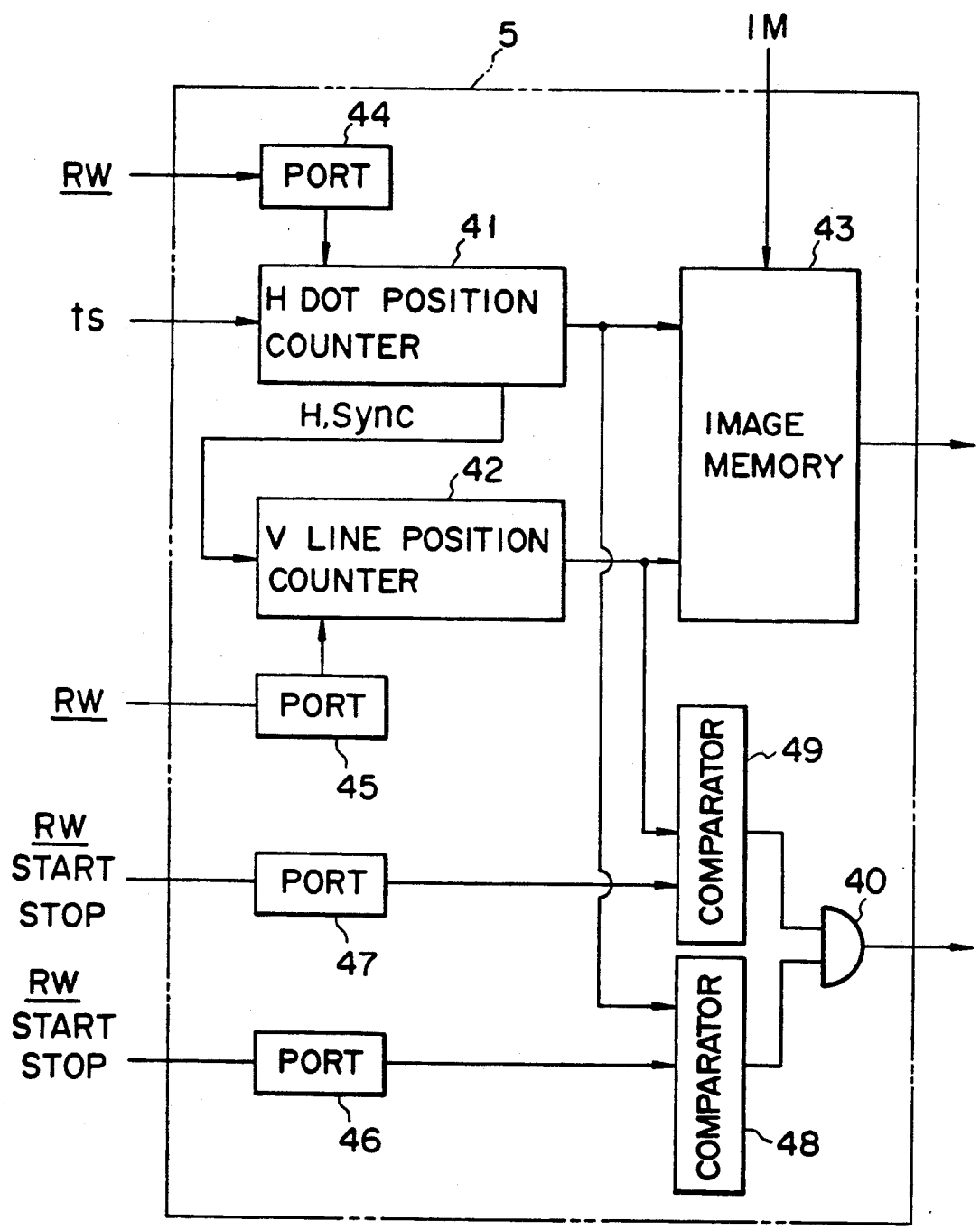
F I G. 4

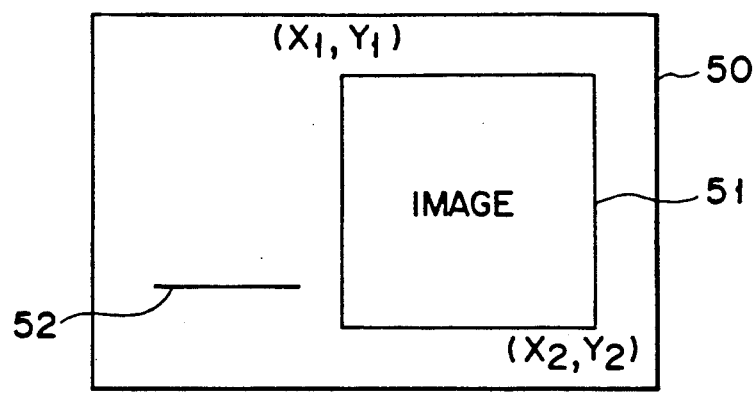
F I G. 5
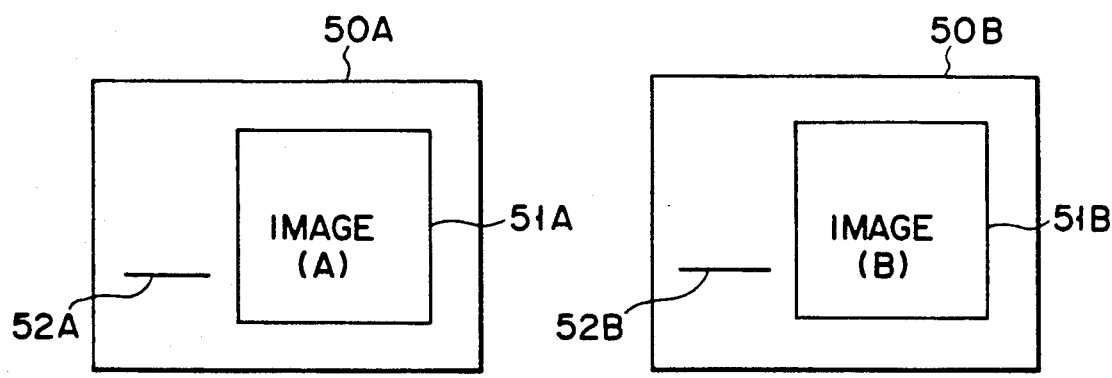
F I G. 6   F I G. 7
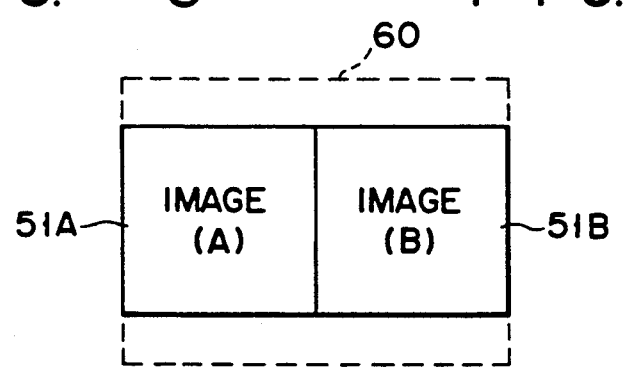
F I G. 8

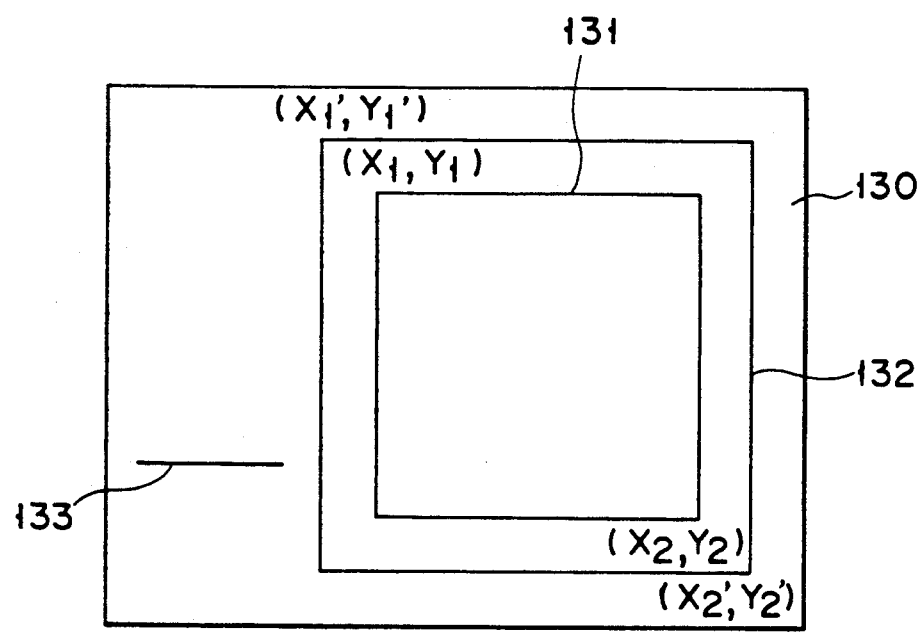
F I G. 15

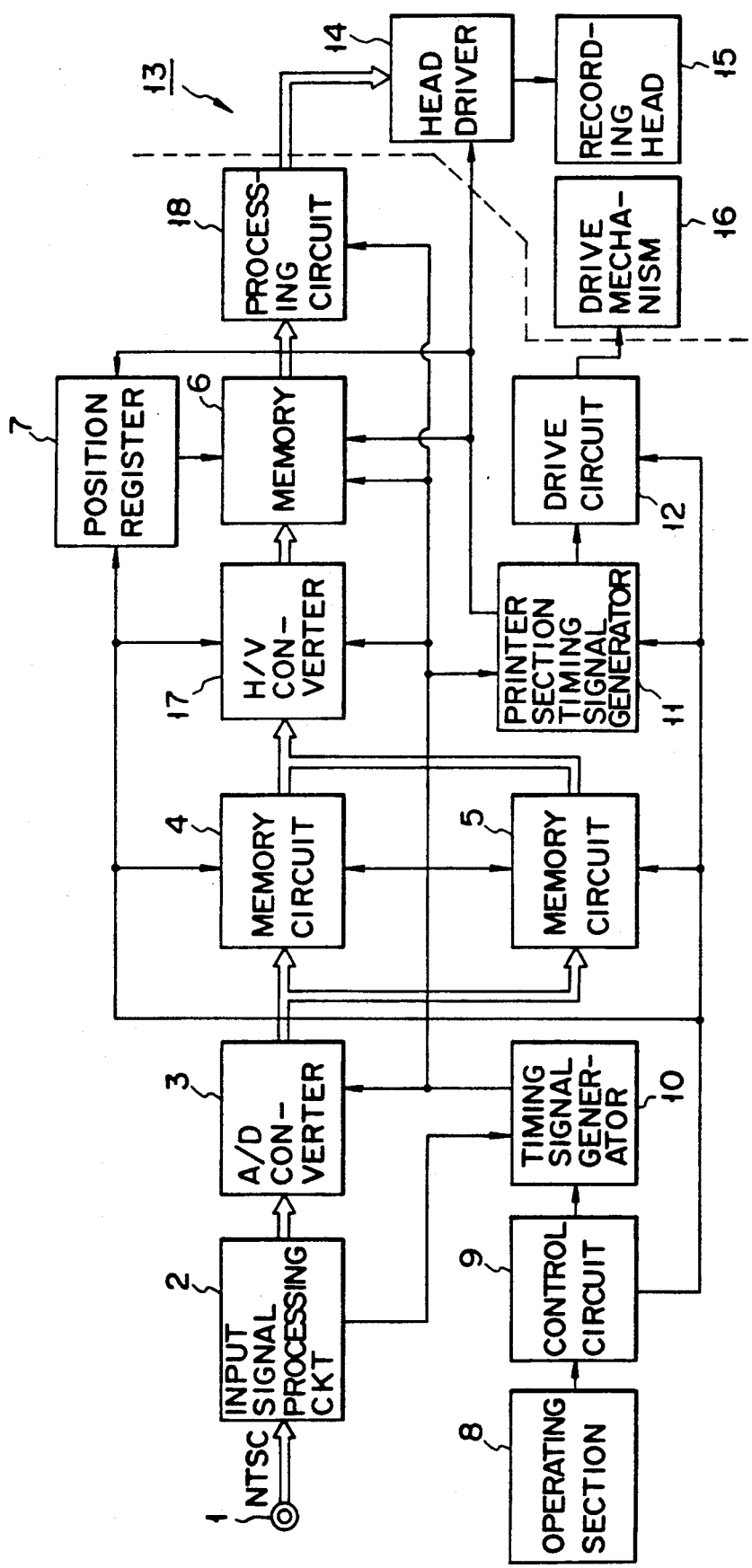
F I G. 17

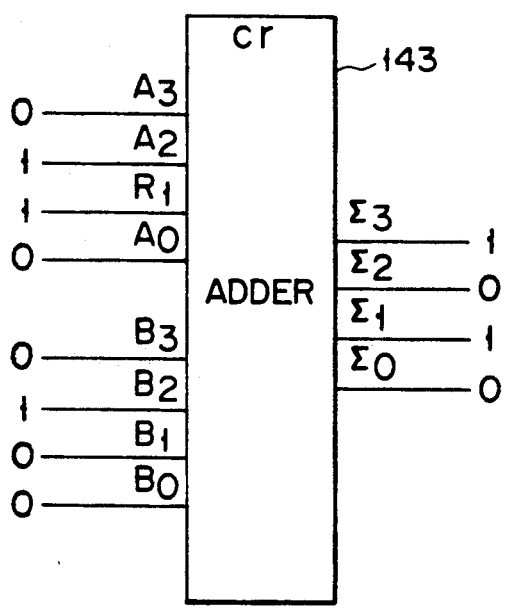
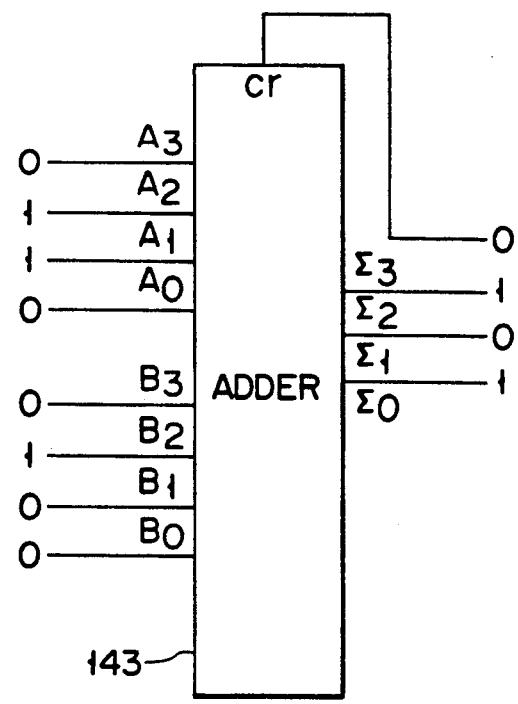
F I G. 19   F I G. 20

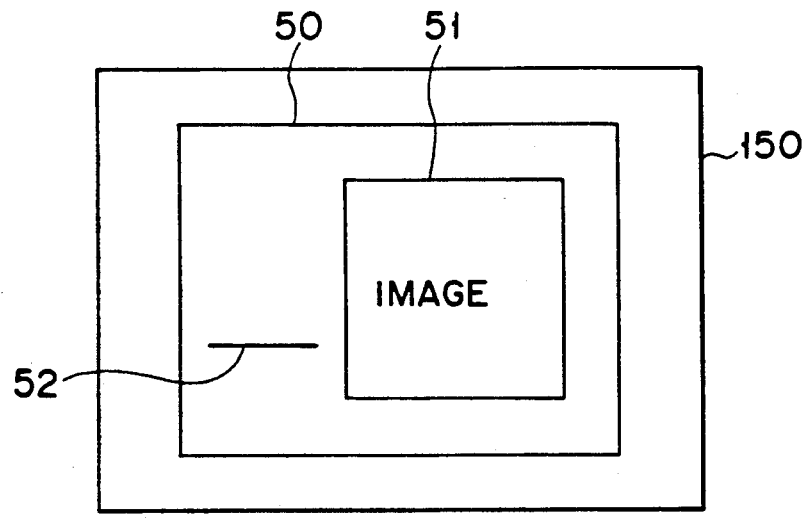
F I G. 21
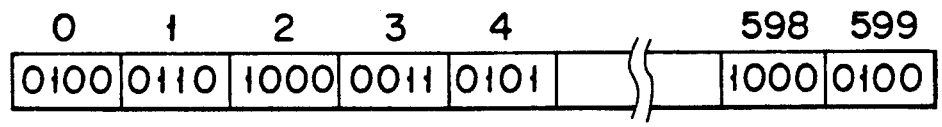
F I G. 22
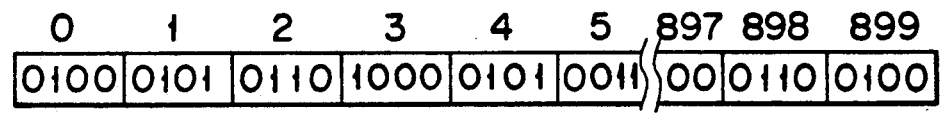
F I G. 23

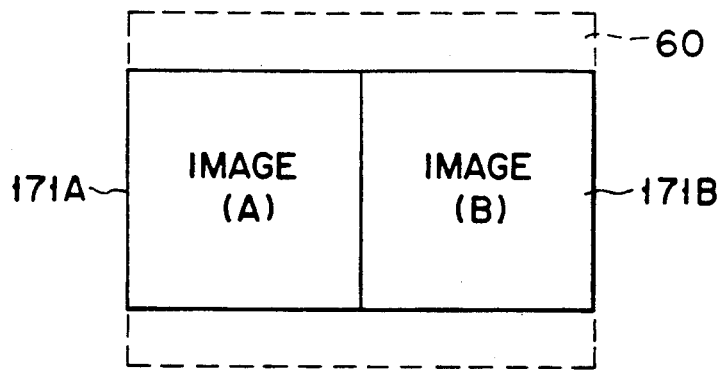
F I G. 28
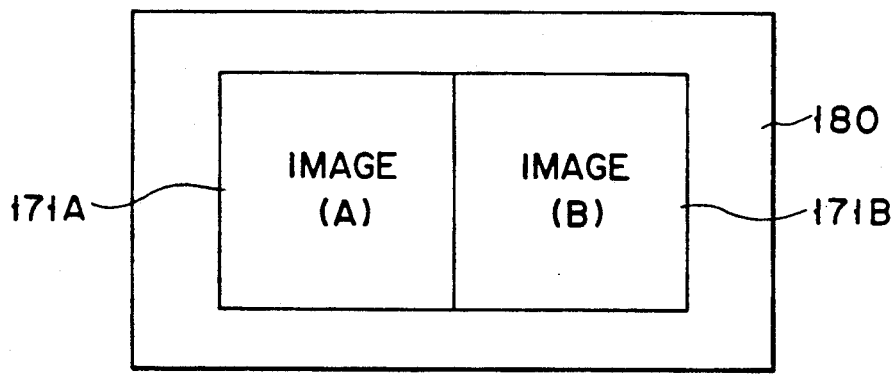
F I G. 29
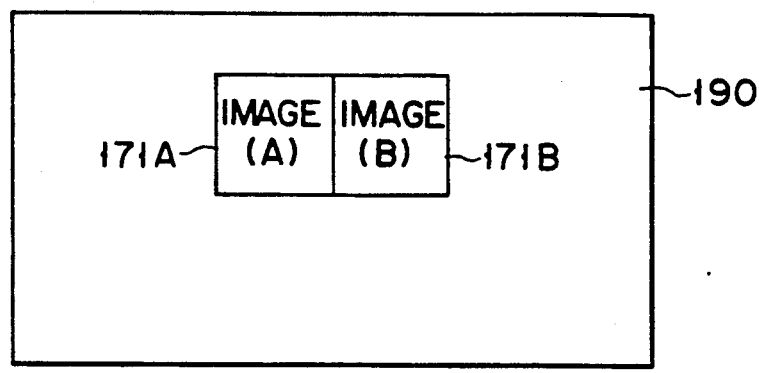
F I G. 30

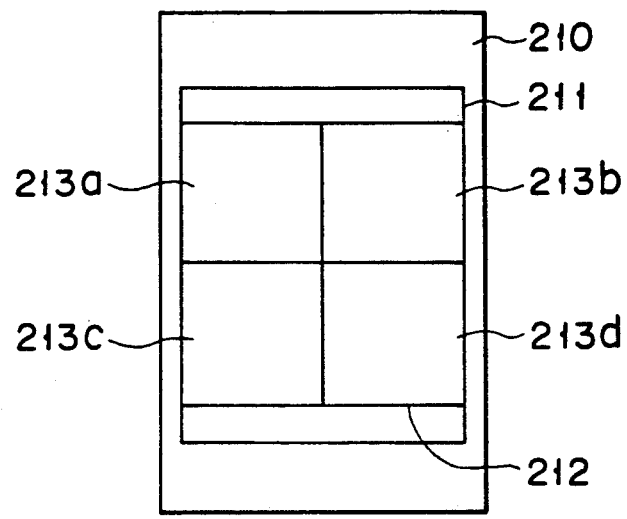
F I G. 33
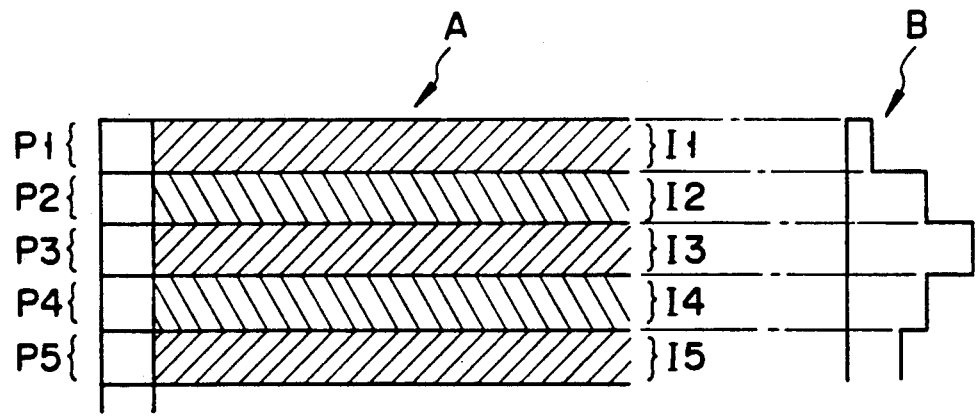
F I G. 34

APPARATUS FOR EDITING AND PRINTING A VIDEO IMAGE

BACKGROUND OF THE INVENTION

1. Field of the Invention

The present invention relates to a video printing apparatus which, with respect to an original video image having a framed dither image area in a specific area of one image, can print an image corresponding to an arbitrarily designated image area or areas on a printing sheet at a determined area.

2. Description of the Related Art

Various types of video printers are known which are responsive to various types of video signals, such as an NTSC reference composite video signal, RGB analog signal and RGB TTL signal, to print a corresponding image on a printing sheet. For example, the following two types are generally known:

(1) A small-image video printer having its scanning image number (for example, 480×480, 480×600) near the number of scanning pixels of a video signal and its printing image size of 80 mm×(80 to 100) mm.

(2) A video printer having its scanning pixel number about two times as many as the number of pixels of the case (1) in the horizontal and vertical directions and its printing image size about four times as large as that of the case (1).

The printer (1) as set out above is of such a type that one original video image is printed on a printing sheet. The printer (2) as set out above is of such a type that one original video image is printed on a printing sheet or four original video images are printed on a printing sheet without being reduced in size.

As one form of application, a video printer is used to prepare a printing image for dealing with a "diagnostic image" or "recording image for diagnosis" on a body cavity of a human subject which is imaged by an endoscope. The "diagnostic image" is employed in almost all cases for diagnosis only, but the "recording image" is employed often together with a clinical chart for a patient. A printing sheet is preferably of such a type that a printing image size is below 80 mm × 100 mm and that, conveniently, a plurality of scenes are printed on a printing image sheet as required. In the latter case, respective original video images are printed on an image sheet on a reduced scale in which case, if printing is performed by a conventional small-image video printer, an image emerges in a poor image quality. Stated in another way, the printing image is such that the number of constituent pixels are so fixed as to be substantially equal to that of an original video image. When printing is done with the original video image reduced in size, an image emerges with the number of pixels of each printing image decimated or thinned out, resulting in a poor image quality with some image information dropped.

SUMMARY OF THE INVENTION

It is accordingly an object of the present invention to provide a video printing apparatus which can properly print a plurality of scenes, on a reduced scale, on a printing sheet without degrading an image quality.

Another object of the present invention is to provide a video printing apparatus which can print an original video image corresponding to a plurality of image areas without dropping character information, such as letters or symbols.

Another object of the present invention is to provide a video printing apparatus which can print an original video image as a high quality one on a printing sheet.

According to the present invention, the aforementioned objects can be achieved in a way as will be set forth below.

(1) A video printing apparatus is provided wherein, with respect to an original video image having a dither image area framed in a specified area of an image, an image of an arbitrarily designated image area or areas are printed on a printing sheet at a specified area, the apparatus comprising:

a unit which, when printing is designated for one image are, takes the original video image as it is and prints it on a printing sheet; and a unit which, when printing is designated for a plurality of image areas, trims only a respective framed image area from a plurality of original video images, edits a respective dither image in the respective image area into one image and prints it on a printing sheet.

(2) In addition to the aforementioned units, the apparatus is also adapted to, when, with respect to the original video image having a letter/symbol information display area at a location other than the dither image area, printing is designated for the original video image corresponding to a plurality of image areas, edit an image of a respective letter/symbol information display area in a positional relation different from that of the dither image of the respective dither image area and print it, together with the dither image, on the printing sheet.

(3) In addition to the above, the apparatus also includes a unit for receiving an original video image having a dither image area of a standard size and that of a larger size than the standard size of the dither image area. When printing of the original video image is designated for a plurality of image areas, a full dither image area is trimmed for the original video image having a dither image area of the standard size, a plurality of trimmed image areas are edited into one image and the edited image is printed on the printing sheet. When, on the other hand, the original video image has a dither image area of a greater size than the standard size of the dither image area, and a full area of it is so trimmed as to be made substantially equal to, or have a central symmetry to, the standard-size dither area, a plurality of such trimmed image areas are edited into one image and printed as such on the printing sheet.

(4) In a video printing apparatus in which, with respect to an original video image having a dither image area framed in a specified area in one image, an image of an arbitrarily designated image area or areas are printed on a printing sheet at a predetermined area, a printer is of such a type that the number of pixels $[l \times m]$ in the original video image is made in an R times $(R > 1)$ format to obtain a signal corresponding to the number of pixels $[L \times M]$.

When printing is designated for one image area, the original video image is interpolated in an R-times enlarging format in the horizontal and vertical directions to obtain a signal corresponding to the number of scanning pixels $[L \times M]$ and printed by the printer on a printing sheet.

When, on the other hand, printing is designated for a plurality of image areas, only respective framed dither image areas are trimmed from the plurality of the original video images, respective dither images of the respective dither image areas are edited into one image, and the number of scanning pixels of the edited image is interporated in an r-times (R>r≧1) enlarging format and printed by the printer on the printing sheet.

(5) In addition to the aforementioned unit, the apparatus includes first printing means for a first mode I for interpolating an original video image in an R-times enlarging format in the horizontal and vertical directions when the original video image is printed on the printing sheet and for printing it on a printing sheet;

second printing means for a second mode II for editing a plurality of original video images in an r-times enlarging interpolation format in the horizontal and vertical directions when the plurality of original video images are to be printed on the printing sheet and for printing an edited image on the printing sheet;

third printing means for a third mode III for trimming only a dither image area from a plurality of original video images when the plurality of original video images are to be printed on the printing sheet, for editing such trimmed dither image areas into one image, for interpolating the number of scanning pixels in the edited image in an r'-times (r≧r') enlarging format and for printing it; and selection means for selecting one of the first, second and third printing means.

By so doing it is possible to obtain the following advantages.

When printing is designated for one image area, a corresponding original video image is taken as it is and printed on a printing sheet. When, on the other hand, printing is designated for a plurality of image areas, a respective framed dither image area is trimmed from the plurality of original video images, and respective dither image in the respective areas is collectively edited into one image and the edited image is printed on the printing sheet. It is also possible to print a plurality of scenes on a reduced scale on the printing sheet without dropping any image information.

Further, it is possible to print one original video image on a single printing sheet in a very finer representation than it is done by a recording head using a coarse recording element density.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 10 are views showing a first embodiment of the present invention,

FIG. 1 being a block diagram showing a whole arrangement of the embodiment,

FIG. 2 being a block diagram showing a detail of an input signal circuit and its peripheral areas, FIGS. 3 and 4 being a block diagram showing an arrangement of a pair memory circuits, FIG. 5 depicts a frame as it is stored in an image memory, FIGS. 6 and 7 are similar to FIG. 5 in showing frames stored in different image memories, for images A and B, respectively, while FIG. 8 depicts a frame stored in an image memory which is a combination of images A and B.

FIG. 9 shows how a frame appears when it is printed in a normal recording mode.

FIG. 10 shows how a frame appears when it is printed in a composite recording mode.

FIG. 15 is an explanative view showing a third embodiment of the present invention;

FIGS. 17 to 34 are views showing a fourth embodiment of the present invention, FIG. 17 being a block diagram showing a whole arrangement of the fourth embodiment, FIG. 18 being a block diagram showing an arrangement of a processing circuit in the fourth embodiment, FIGS. 19 and 20 being views showing an operation of an adder in the processing circuit of FIG. 18, FIG. 21 depicts a printing sheet, frame, image and identification code, FIG. 22 shows one line of image information, FIG. 23 is a processed version of a line of image information which is delivered to the head driver, FIG. 24 shows a format for recording on a printing sheet one image area in a frame, FIGS. 25 and 26 show frames of different images, FIG. 27 is a flow chart for executing a composite recording mode, FIG. 28 shows a developed format into which are stored the images of FIGS. 25 and 26.

FIG. 29 shows how the images of FIG. 28 appear in enlarged form on a printing sheet, FIG. 30 is similar to FIG. 29 but without the images being enlarged, FIG. 31 shows an image printed in the same format as it appears in an original video image layout, FIG. 32 depicts a comparison between an input original video image and the scanning lines of a printer, FIG. 33 shows a print image derived by trimming a dither image area, and FIG. 34 is similar to FIG. 32 but shows an improved image.

DETAILED DESCRIPTION OF THE PREFERRED EMBODIMENTS

A video printing apparatus according to first to third embodiments of the present invention will be explained below with reference to FIGS. 1 to 14. When a designation is made to print out an image corresponding to one image area, the apparatus takes out an input image signal for printing on a printing sheet. When a designation is made to print out a plurality of images, a dither image area designated by an input image signal is obtained through trimming and printing is done after the plurality of images trimmed are collectively edited by a memory means into a single image. The printing apparatus includes the following technical means:

(1) Means for converting an input image signal from an analog to a digital form (A/D converter).

(2) Means for storing the digital signal therein.

(3) Memory means for storing a printing image therein in an edited format.

(4) An operation section and control circuit for generating an address signal corresponding to a framed specified dither image area.

Upon printing out a color image, it is necessary to process a corresponding image signal in accordance with color units of R, G and B. In order to perform a color masking processing to improve a color reproduction, it is necessary to simultaneously take up color signal information, such as R, G, B or C, M, Y, and perform a predetermined calculation processing. It is, therefore, preferred that an A/D converter, image signal memory circuit, etc., be provided in accordance with each color. In a case where the printing of the colors C, M and Y are to be performed in a multi-color recording mode, an editing/storing memory and so on can be commonly used for the respective colors. For a color image to be printed on a sheet, it is better to partly modify a circuit arrangement.

FIRST EMBODIMENT

Figure 1:
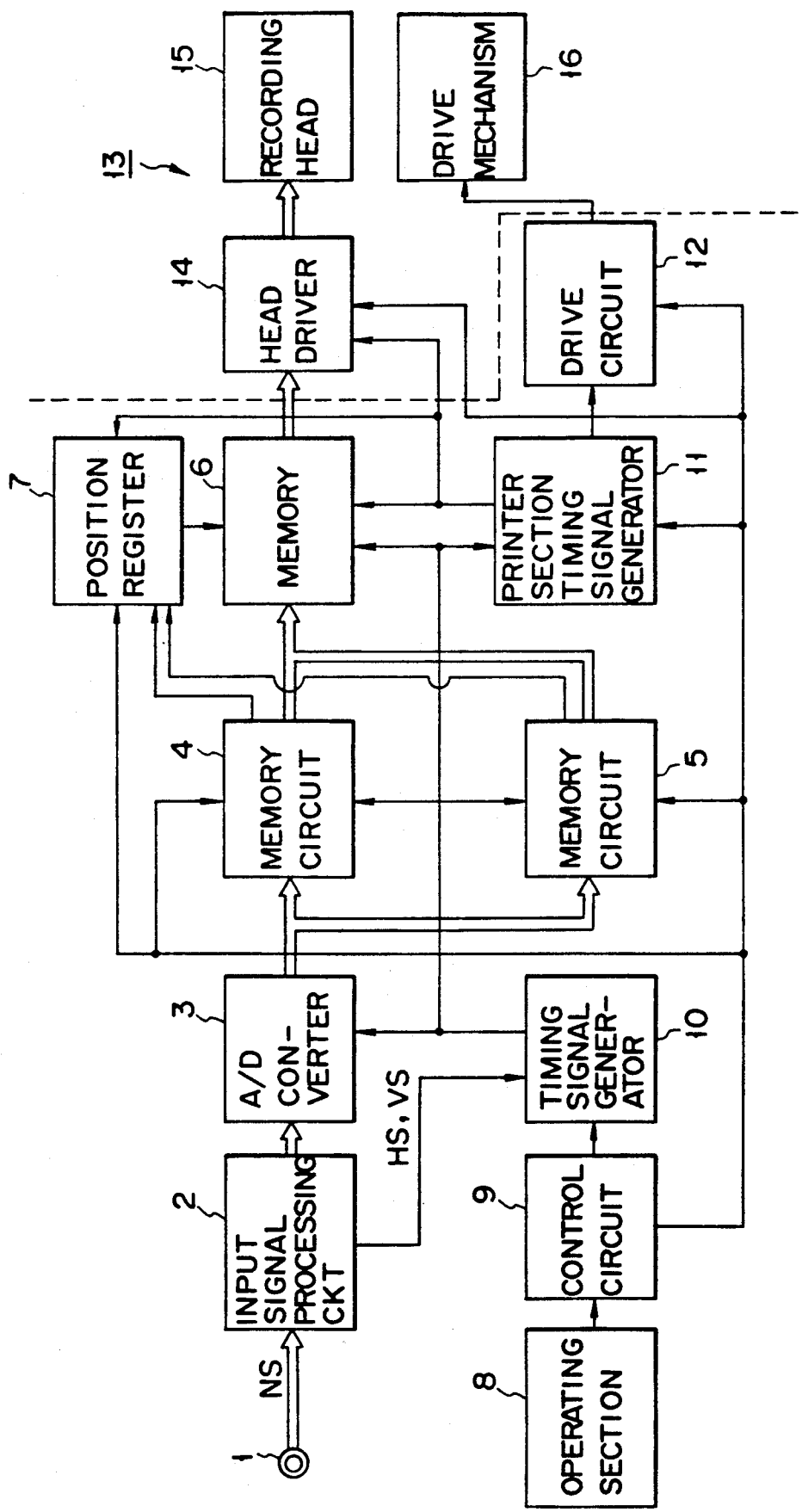

FIG. 1 is a block diagram showing a practical apparatus according to a first embodiment of the present invention.

An input terminal 1 as shown to the left in FIG. 1 is used to input an NTSC video signal NS which is a video image signal.

Upon receipt of the NTSC video signal NS from the input terminal 1, an input signal processing circuit 2 separates it into horizontal and vertical synchronizing signals HS and VS through its processing action and delivers them to a timing signal generator 10.

An A/D converter 3 samples the NTSC video signal NS, supplied from the input signal processing circuit 2, with a predetermined frequency and converts it to a digital signal.

Memory circuits 4 and 5 receive image information from the A/D converter 3 and store it at their image memory as will be set out below. A memory 6 stores data at a predetermined area which is read out of the image memory in the memory circuits 4 and 5.

A position register 7 is responsive to a signal supplied from a control signal as will be set forth below and output information signals supplied from the memory circuits 4 and 5 to generate an address for designating data, read out of the image memories, to any specific position in the memory 6 in a developed format.

An operating section 8 includes input means, such as ten keys, and supplies operation instructions for various associate areas and designation signals for editing image designation, image input start instruction, print mode designation, print start instruction, and so on, to the control circuit 9.

The control circuit 9 is composed of a microcomputer, etc., and responsive to the instruction or designation signal supplied from the operation section 8 and program stored therein to deliver a corresponding control signal to an associated circuit or circuits.

The timing signal generator 10 is responsive to the control signal supplied from the control circuit 9 and horizontal and vertical synchronizing signals HS and VS supplied from the input signal processing circuit 2 to produce a timing signal for controlling various associated circuits.

A timing signal generator 11 for a printer section is responsive to the control signal supplied from the control circuit 9 and timing signal supplied from the timing signal generator 10 to deliver a timing signal for a specific printer section to the memory 6, position register 7, driver circuit 12 and head driver 14 for the printer section 13 as will be set forth below.

The drive circuit 12 is responsive to the control signal supplied from the control circuit 9 and timing signal supplied from the timing signal generating circuit 11 for the printing section to drive, for example, a motor in a drive mechanism 16 as will be set out below.

The printer section 13 is composed of a head driver 14, recording head 15, drive mechanism 16, etc.

The head driver 14 is responsive to the timing signal supplied from the timing signal generator 11, control signal supplied from the control circuit 9 and image information, etc., read out of the memory 6 to deliver a printing signal to the recording head 15.

The recording head 15 has a plurality of heat generating elements in a line array. These heat generating elements are selectively heated based on the printing signal supplied from the head driver 14 whereby a recording is performed on a recording sheet, not shown.

In the present embodiment, the recording head 15 is constituted by 600 heat generating elements formed within a section of a dimensions of 100 mm. It is thus possible to make an image recording at a recording density of 6 dots/mm. A heat sublimation type transfer system, etc., are preferable as the recording system.

The drive mechanism 16 is so constructed as to include mechanical elements necessary for printing and held in an apparatus body. The mechanism 16 performs various operations, such as the conveyance of an ink sheet and recording sheet, movement of a recording head 15 and rotation of a platen roller.

Figure 2:
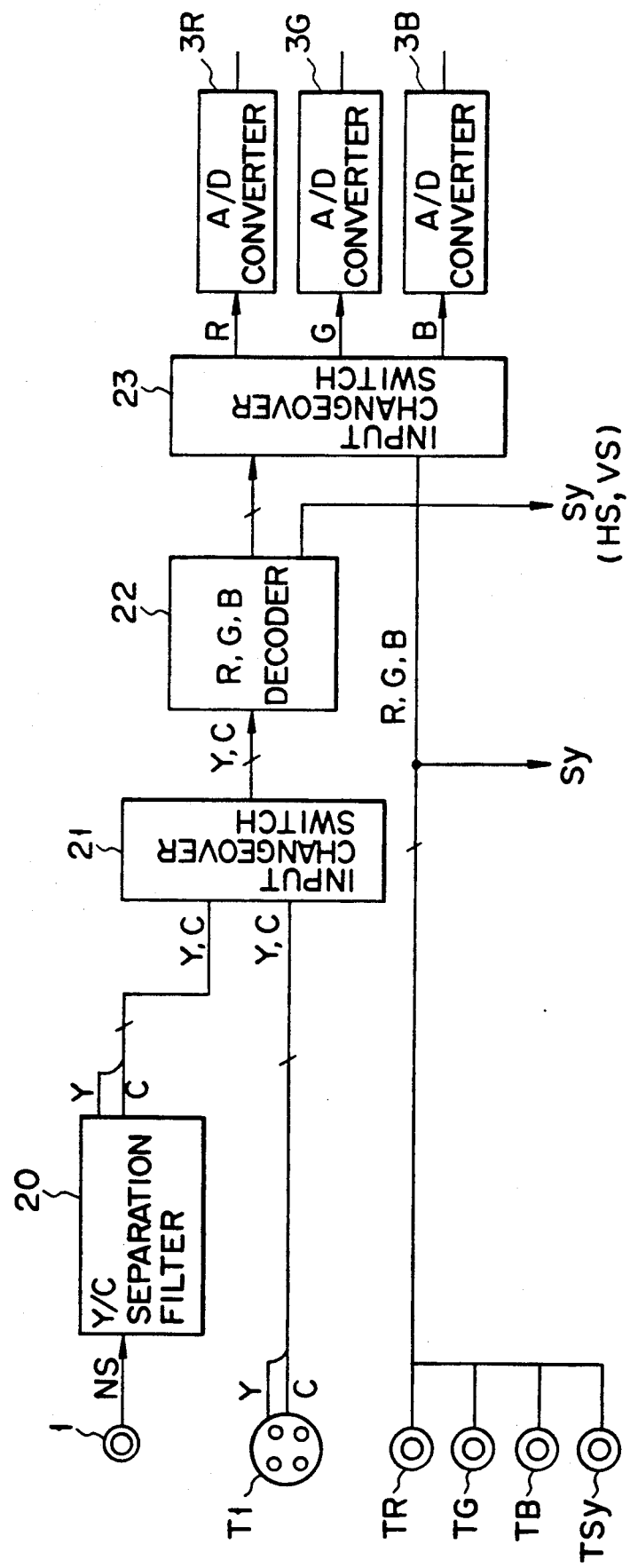

FIG. 2 is a block diagram showing a practical arrangement of the input signal processing circuit 2 and its surrounding areas which can cope with the inputting of a color video signal supplied from the input terminal 1.

For a color video signal, it is necessary to make a separation into the three primary colors R, G and B for printing. As shown in FIG. 2, an NTSC composite video signal NS from the input terminal 1 is separated by a Y/C separation filter 20 into a Y signal and C signal. An input changeover switch 21 selectively switches either one of an input signal supplied from a separate terminal T1 or NTSC composite video signal NS. One of the Y and C signals which is selected by the input changeover switch 21 is converted by an R/G/B decoder 22 to R, G and B signals. The R, G and B signals are supplied to A/D converters 3R, 3G and 3B via an input changeover switch 23 which correspond to the respective colors R, G and B. The R/G/B decoder 22 separates a horizontal synchronizing signal HS and vertical synchronizing signal VS and sends them to the timing signal generator 10. Color signal input terminals TR, TG and TB and synchronizing signal input terminal TSy receive corresponding input signals and deliver the respective signals to the A/D converters 3R, 3G and 3B via the input changeover switch 23.

FIG. 3 shows an arrangement of the memory circuit 4 and FIG. 4 shows an arrangement of the memory circuit 5. As will be appreciated from the above, the arrangement of the memory circuit 4 is exactly the same with that of the memory circuit 5. Therefore, an explanation will be given below of the memory circuit 4 only, noting that a number series "30's" is attached to the portions of the memory circuit 4 against the portions of the memory circuit 5 with a number series "40's" attached thereto. As will be seen from FIG. 3, the memory circuit 4 is comprised of a H (horizontal) dot position counter 31, V (vertical) line position counter 32, image memory 33, ports 34, 35, 36 and 37, comparators 38 and 39, AND circuit 30, etc.

The value of the H dots, that is the number of pixels in one horizontal line, is set to the port 34 by a signal RW supplied from the control circuit 9, and, the value of the V lines, that is the number of lines in the vertical direction, is set to the port 35 by a signal RW supplied from the control circuit 9.

The H dot position counter 31 counts a timing signal ts input from the timing signal generator 10 and supplies a result to the comparator 38 and address bus of the image memory 33. The H dot position counter 31 counts a predetermined number corresponding to a value set at the port 34, that is the number of dots in one line, to deliver a horizontal synchronizing signal HS to the V line position counter 32.

The V line position counter 32 counts the value set at the port 35 and a signal HS supplied from the H dot position counter 31 and delivers a result to the image memory 33 and comparator 39.

The image memory 33 is composed of a RAM, etc., and has a capacity for storing an image 51 corresponding to one image area of a frame 50 shown in FIG. 5. The frame 50 is composed of, for example, a 600 dots in width×480 lines in length (100×80 mm in printing dimension at a recording density of 6 dots/mm). In FIG. 5, 52 shows an identification code.

Referring back to FIG. 3, the comparator 38 delivers a signal, supplied from the H dot position counter 31, in accordance with an instruction coming from the port 36. The comparator 39 similarly delivers a signal, supplied from the V line position counter 32, in accordance with an instruction coming from the port 37. X coordinates at an extreme end in the frame 50 in FIG. 5 are set at the ports 34, 36 by signals representing RW, START and STOP addresses supplied from the control circuit 9. Similarly, Y coordinates at an extreme end in the frame 50 are set at the ports 35, 37 by signals supplied from the control circuit 9.

The AND circuit 30 receives signals from comparators 38 and 39 and delivers data as an enable signal IS to the memory 6.

The memory circuit 4 operates as follows.

When image information IM is received by the image memory 33 via the A/D converter 3, it is sequentially stored in the image memory 33 for each line in accordance with signals (address data) from the H dot position counters 31 and V line position counter 32 while using the timing signal ts coming from the timing signal generator 10. The image information is sequentially read out of the image memory 33, as in the recording operation, for every line in accordance with the address data and timing signal. As a normal recording mode as will be set forth below, the image information thus read out is stored in the memory 6, noting that the image information contains information corresponding to an image 51A and identification code 52A in a frame 50A as shown in FIG. 6. As in a composite recording mode as will be set forth below, a frame 50A is stored in the image memory 33 and a frame 50B (FIG. 7) is stored in the memory 43. Then addresses X1, X2 and Y1, Y2 in the image areas in the frames 50A, 50B are supplied to the ports 34, 36 and 35, 37 and only information of the images 51A, 51B are stored in the memory 6. Images 51A and 51B are different from each other.

An image 51A input to the memory 6 is stored, by the position register 7, in a developed format in such memory area 60 as indicated to the left half in FIG. 8.

The image 51B input to the memory 6 is stored, by the position register 7, in a developed format in the memory area 6 as indicated to the right in FIG. 8.

The video printing apparatus of the present invention has a "normal recording mode" and "composite recording mode".

Normal Recording Mode

Figure 9:
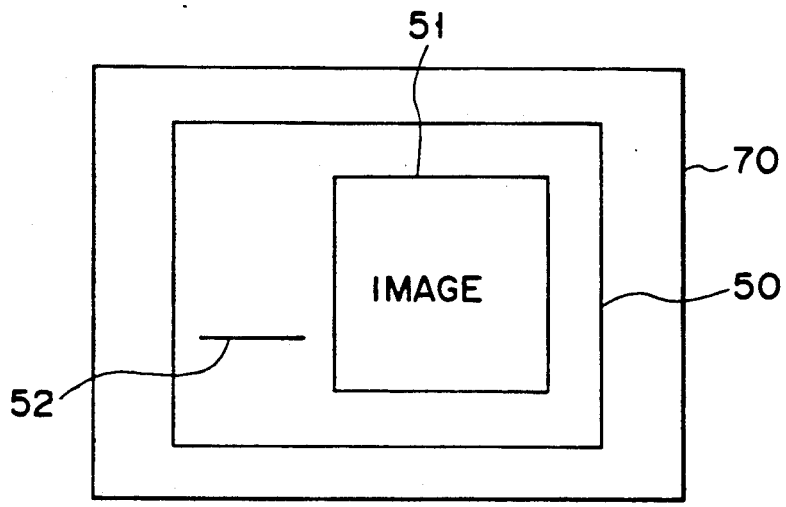

This is a mode for recording, on a printing sheet 70, a full image area of an input frame in a manner as indicated in FIG. 9.

Composite Recording Mode

This is a mode for storing the image 51A in the frame 50A in the image memory 33 as shown in FIG. 6 and then the image 51B in the frame 50B in the image memory 43 as shown in FIG. 7 and for editing the images 51A and 51B in a developed format in the memory 6.

Let it now be assumed that a print start switch, not shown, at the operation section 8 as shown in FIG. 1 is depressed in the composite recording mode. Then the image 51A in the frame 50A as stored in the image memory 33 and image 51B in the frame 50B as stored in the image memory 43 are developed as one edited image in the memory 6 as shown in FIG. 8.

Figure 10:
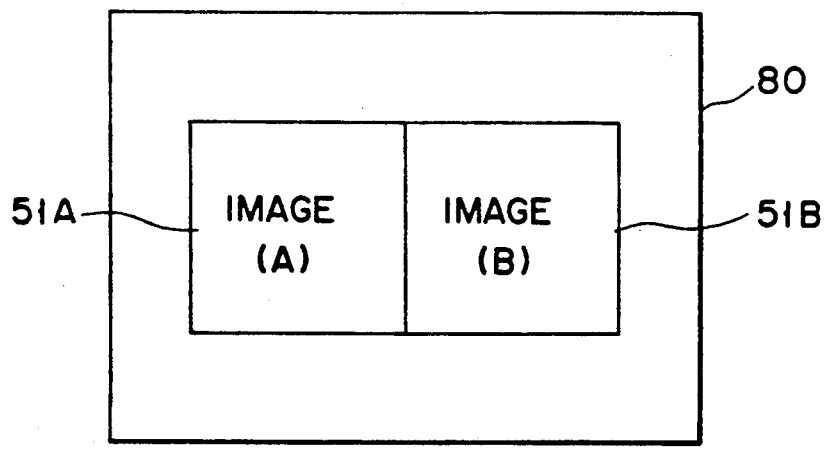

After this, the images 51A and 51B are printed, by the printer section 13, on a printing sheet 80 in a manner as indicated in FIG. 10.

According to the present embodiment, an image can be properly printed out, without degrading an image quality, even in the case where a plurality of scenes are to be printed as an original video image on a printing sheet.

Although the present embodiment has been explained in connection with editing two images into a composite image, it is not restricted thereto. Needless to say, it is possible to edit any desired number of images into a composite image. Although, in the present embodiment, the processing circuit for the monochrome image has principally been explained for brevity's sake, it is needless to say that a color image can similarly be processed for respective colors in an edited format. In the aforementioned embodiment, the horizontal scanning direction of the printer coincides with the horizontal scanning direction of the original video signal, but it is possible to print out an image in a direction orthogonal to the horizontal scanning direction of the original video signal. In this case, it is only necessary to change the sequence of the write address and read address relative to the memory 6. Although, in the aforementioned embodiment, addresses are designated from the operating section 8 so as to print an image on a printing sheet after predetermined portions are trimmed from a plurality of image areas and edited properly in the memory 6, it is preferable to do the following steps from a practical aspect, that is, with the address designating information initially held in the control circuit 9 to allow editing of the image areas, only an input operation of mode selection, such as a 1-, 2- and 4-image print mode, is performed at the operating section 8 to read out a corresponding initially designated address so that a printing is carried out in an automatic edit format. Although a plurality of memory circuits (4, 5 are shown) are used in the embodiment shown in FIG. 1 for storing an A/D converted replica of the image signal, only one memory circuit may be provided for simplification in which case, upon each entry of an image corresponding to an image area, it is sequentially written into the memory 6 at a predetermined corresponding frame area in a developed format. In a practical circuit, an image processing circuit, etc., are provided for color conversion and for image quality improvement, though being omitted for brevity sake and for no close direct relevancy to the present invention.

SECOND EMBODIMENT

This embodiment is used to incorporate, into a composite image obtained from the first embodiment, letter/symbol pattern information such as an identification code which is provided in a respective frame.

Figure 11:
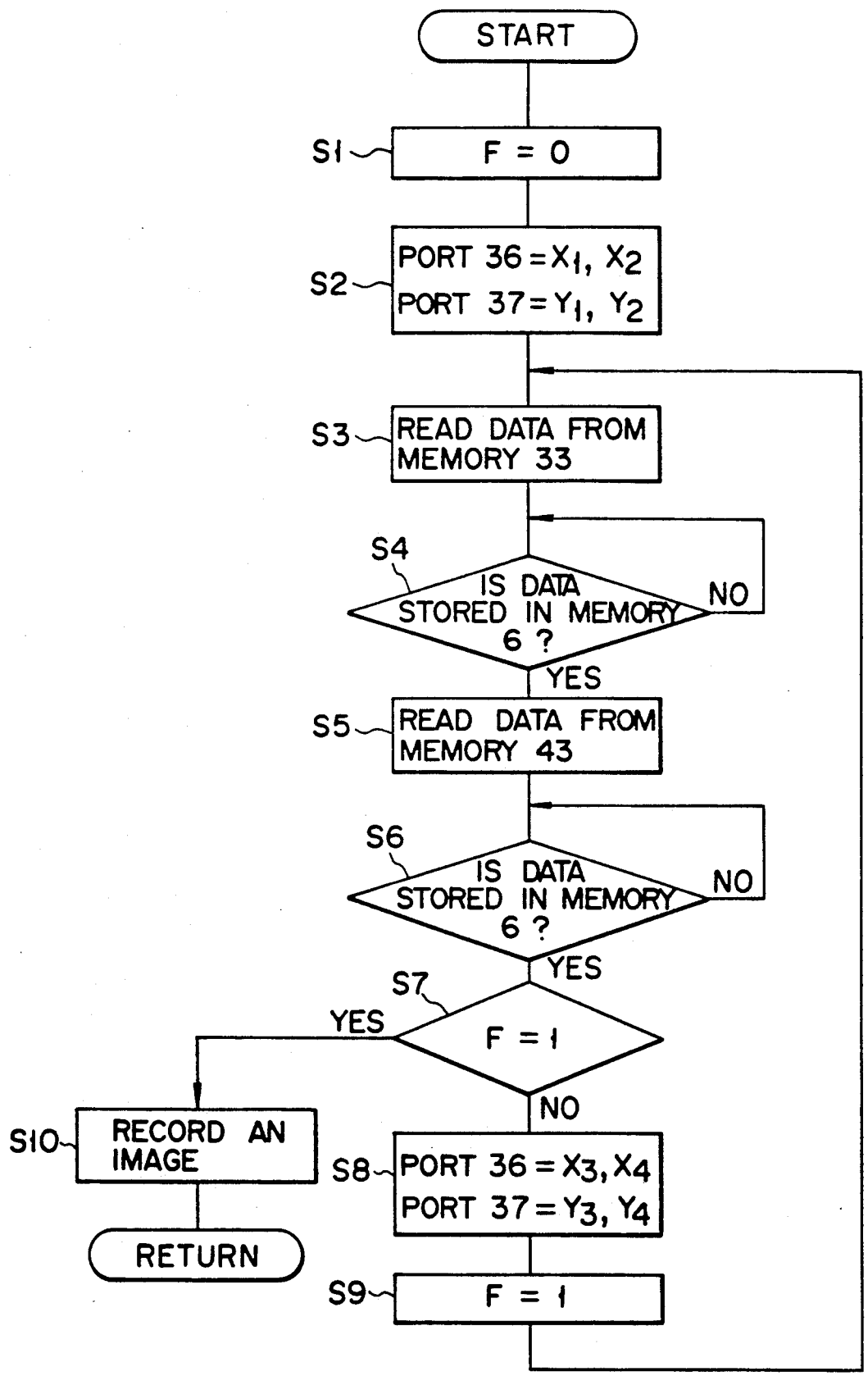
FIG. 11 is a flowchart showing an operation program of a second embodiment of the present invention.
Figure 12:
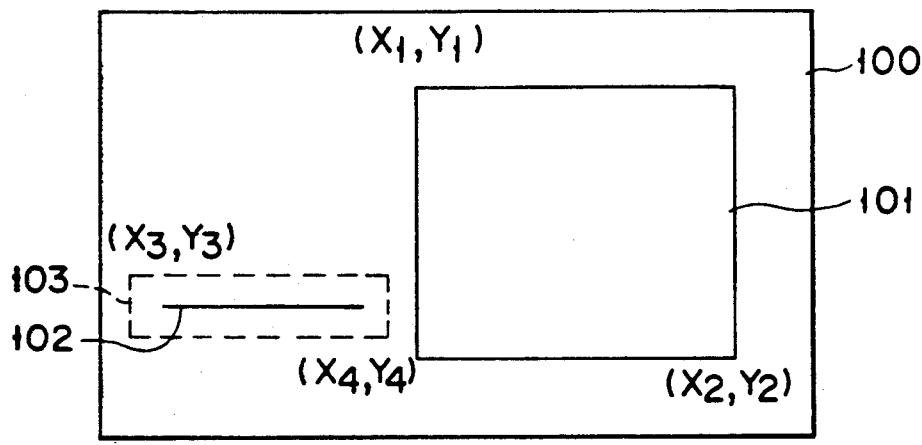
FIGS. 12 to 14 are views showing an explanative operation view relating to the second embodiment of the present invention.
Figure 13:
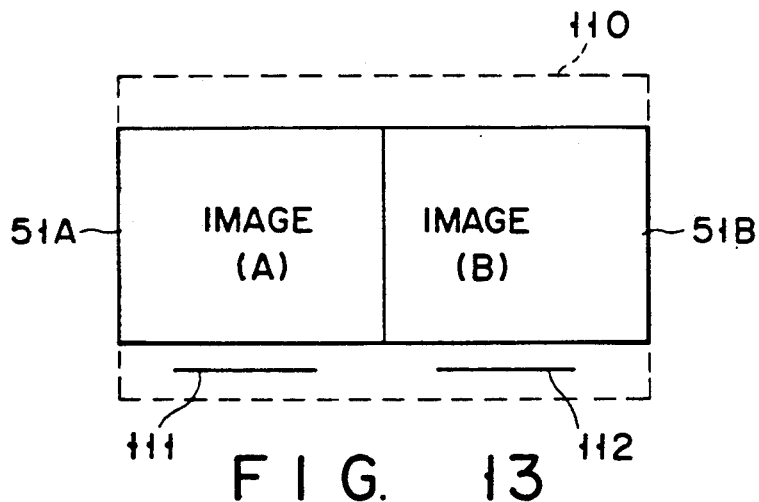

FIG. 11 is a flowchart showing an operation program for the present embodiment. Let it be assumed that image information corresponding to frames 50A and 50B are stored in the image memories 33 and 43, respectively. The present program is carried out by selecting an identification mark incorporation mode.

At step S1, a flag F is set to be "0" (F=0).

At step S2, values X1 and X2 are stored in the port 36 and values Y1 and Y2 are stored in the port 37.

At step S3, the image information corresponding to the frame 50A is read out of the image memory 33 and an image 51A is stored in the memory 6 in a developed format.

At step S4, it is determined whether or not the reading of the image information is completed. If not, step S4 performs the same routine repetitively and, if yes, goes to step S5.

At step S5, image information corresponding to the frame 50B is read out of the image memory 43 and an image 51B is stored in the memory 6 in a developed format.

At step S6, it is determined whether or not the reading of the image information out of the image memory 43 is completed. If not, step S6 performs the same routine repetitively and, if yes, goes to step S7.

At step S7 it is determined whether or not the flag F is set to be "1" (F=1). If F=0, step S8 goes to step S8.

At step S8, values X3 and X4 are stored in the port 36 and values Y3 and Y4 are stored in the port 37. The values stored in the ports 36 and 37 correspond to a broken-line area 103 as indicated by the coordinates X3, Y3 and X4, Y4 in FIG. 12 and contain letter pattern information. In FIG. 12, 100, 101 and 102 represent the frame, image area and identification code.

Step S9 sets the flag F to "1" (F=1) and goes back to step S3 to repeat the operation as set out above. Letter pattern information 111 and 112 of the frames 50A and 50B are stored in the memory 6 at an area 110 shown, for example, in FIG. 13.

When F=1 at step S7, it is determined that the storing of the image information in the memory 6 in a developed format is all completed.

Figure 14:
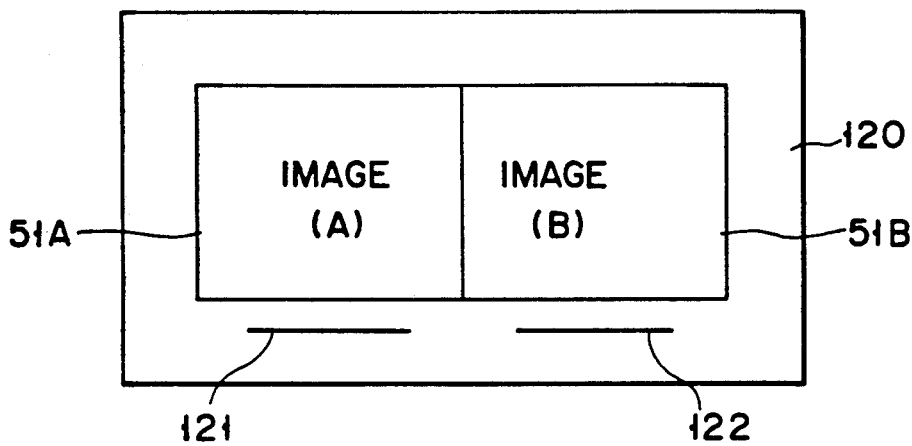

As step S10, the image is stored, and then the recording of the image is all completed and thus the image information is recorded on a printing sheet 120 in a manner shown in FIG. 14. In FIG. 14, 121 and 122 correspond to areas on which the letter pattern information are recorded.

According to the present embodiment, a plurality of image areas can be printed on the same printing sheet without dropping the information of the letter, symbol, etc.

THIRD EMBODIMENT

This embodiment can deal with image information corresponding to an image area 132 (X1', Y1' and X2', Y2'), as shown in FIG. 15, which is larger in size than the previous standard image area 131 (see FIG. 5). In FIG. 15, 130 and 133 represent a frame and identification code, respectively.

Figure 16:
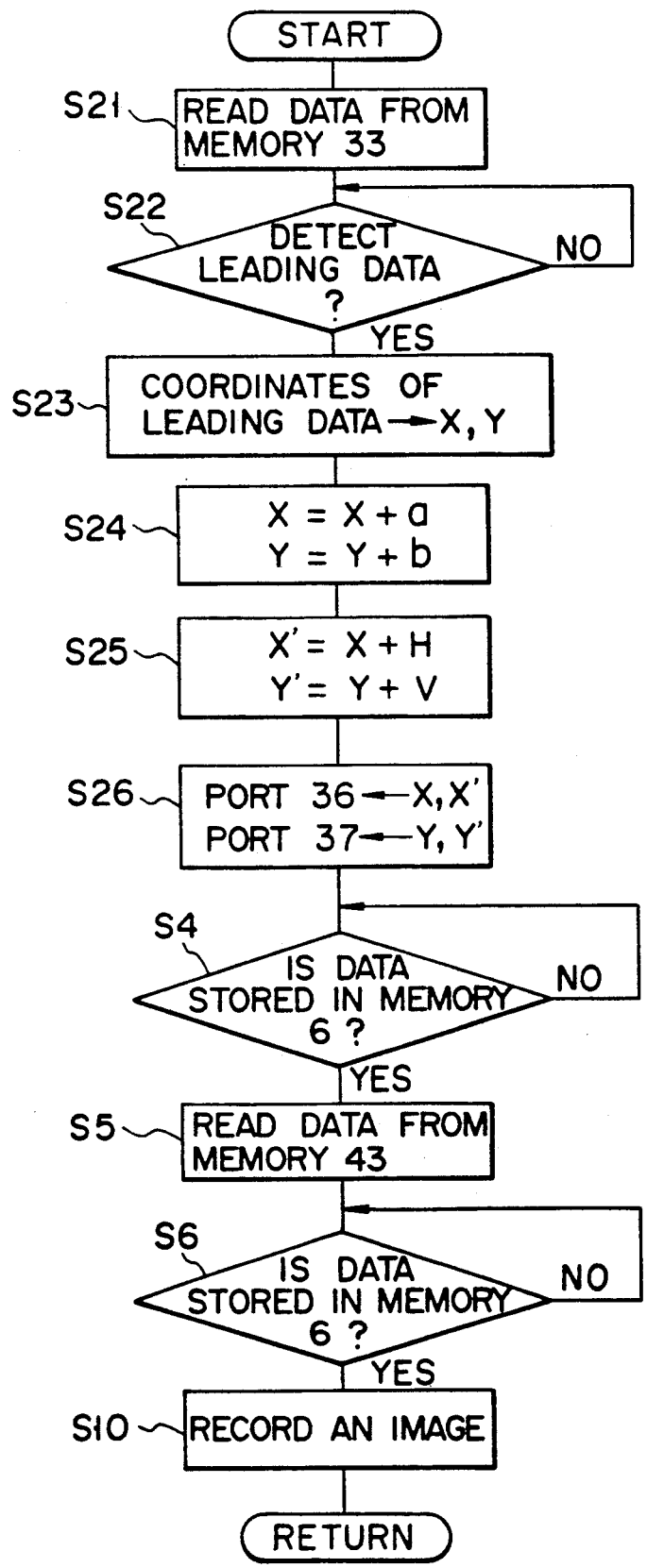
FIG. 16 is a flowchart showing an operation program of a third embodiment of the present invention.

An operation program for the present embodiment will be explained below in accordance with a flowchart shown in FIG. 16. In FIG. 16, the same step values as those in FIG. 11 are employed to designate steps involved and further explanation is omitted with the same values added.

Let it be assumed that image information corresponding to frames 50C and 50D, not shown, are stored in the image memories 33 and 43.

A present program is implemented by selecting a predetermined mode.

At step S21, image information corresponding to a frame 50A is read out of the image memory 33.

At step S22, checking is made to see whether or not the leading data of an image area in the same frame 50A is detected. The leading data represents the coordinates X1', Y1' in FIGS. 15 and is detected by a circuit, not shown. While the leading data is not detected, the same routine is carried out and, otherwise, step S22 goes to step S23.

At step S23, address values X and Y are stored as the coordinates of the leading data at a corresponding memory location.

At step S24, calculations $X=X+a$ and $Y=Y+b$ are carried out where a, b represent a setting value, a difference on the coordinate values when a center symmetry is created between the larger image area 132 and the standard image area 131.

At step S25, calculations $X'=X+H$ and $Y'=Y+V$ are carried out where H and V represent horizontal and vertical values, respectively, on the image area 131 of standard size.

At step S26, values X and X' are stored at the port 36 and values Y and Y' are stored at the port 37.

By doing so, it is possible to read out information corresponding to the standard image area bearing a central symmetry to the larger image area 132 from which the standard image area is trimmed. It is thus possible to print out an image, corresponding to a plurality of trimmed image areas, in an edited format.

FIGS. 17 to 34 show a video printing apparatus according to a fourth embodiment of the present invention, features of which are as follows.

The present apparatus is of such a type that, when a designation is made to print out an image corresponding to one image area, an input image signal is enlarged through an R-times enlarging interpolation to perform the aforementioned print-out operation and that, when a designation is made to print out an image corresponding to a plurality of image areas, dither image areas designated by the input image signal are obtained, through trimming, and enlarged in an edited format through an r times ($R<r\leq 1$) interpolation to perform the aforementioned print-out operation. The present apparatus includes the following technical means:

(1) Means for converting an input image signal to a digital signal through an A/D conversion.

(2) Means for storing the digital signal corresponding to the input image signal.

(3) Coordinate input means for trimming a predetermined dither image area from an original image.

(4) Memory means for storing a printing image therein in an edited format.

(5) Means for enlarging an image through an enlarging processing.

(6) Means for designating a printing mode.

(7) Printer having the number of scanning pixels (L×M) R times (R>1) the number of pixels (l×m) of which the A/D converted replica of the input image signal is composed.

When a color image is to be printed out, it is better to modify part of a circuit arrangement involved, as in the case of the first embodiment.

FOURTH EMBODIMENT

FIG. 17 is a block diagram showing an arrangement of this embodiment. In this Figure, the same reference numerals are employed to designate parts or elements corresponding to those shown in FIG. 1 and any duplication of an explanation is omitted.

The present printer will be explained below as one having an effective printing area of a dot density of 10 dots/mm, number of dots 960×720 and image dimensions 96.0×72.0 mm.

A vertical/horizontal converter 17 is composed of a usually called "a logical image controller". This converter 17 performs various processings, such as a rotation, enlargement and reduction, on image information read out of an image memory 33 in an image circuit 4 and image memory 43 in an image memory 5.

A memory 6 stores, in a predetermined area, image information processed by the, converter 17.

A position register 7 is responsive to a signal supplied from a controller 9 to generate an address for allowing image information which is output from the converter 17 to be stored in any specified area of the memory 6.

A processing circuit 18 is of such a type as to enlarge an image and composed of, for example, a latching circuit, adder and selector.

Figure 18:
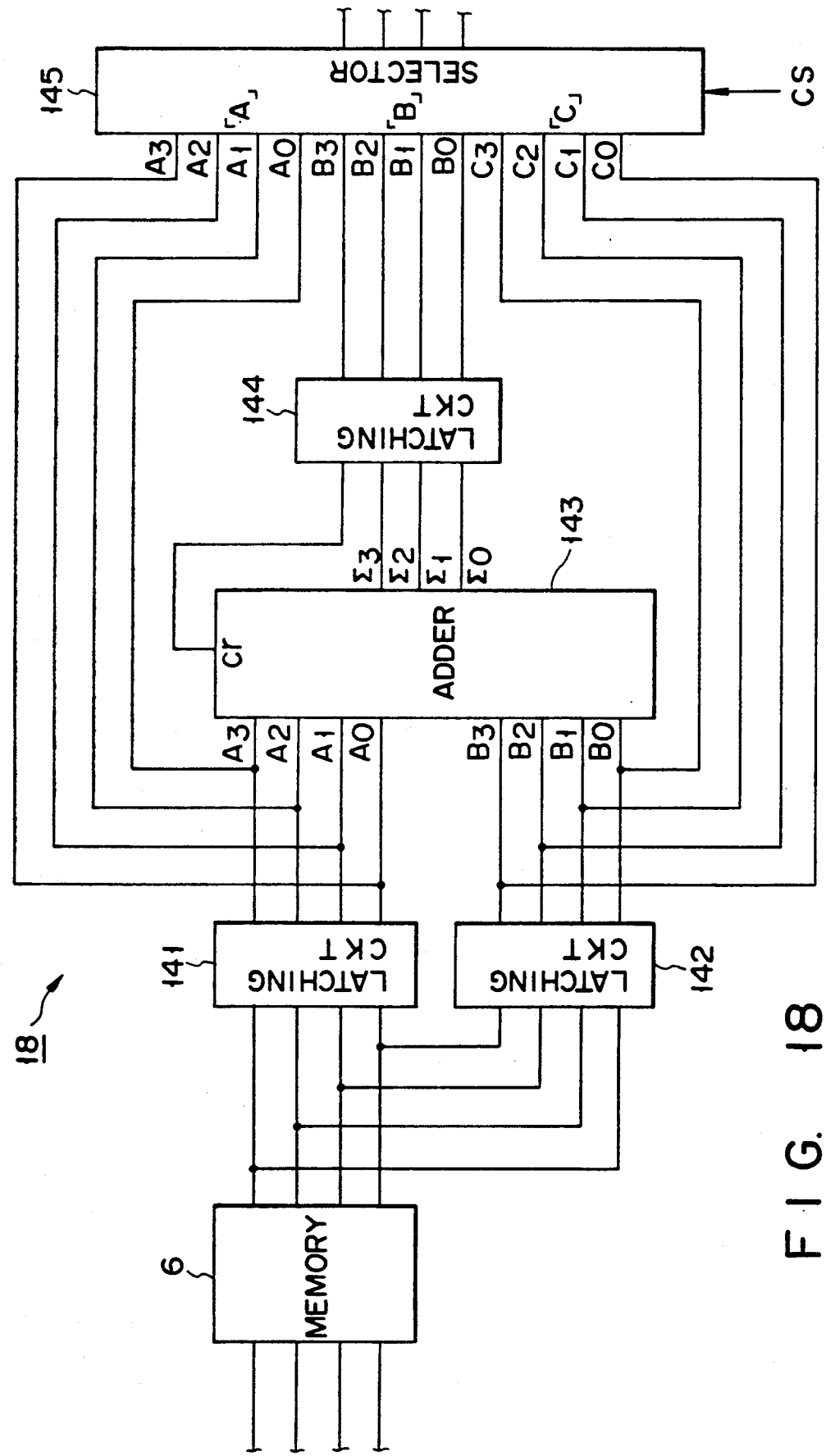

FIG. 18 is a block diagram showing a practical arrangement of a processing circuit 18. The circuit 18 comprises a pair of latching circuits 141, 142, adder 143, another latching circuit 144 and selector 145.

The processing circuit 18 receives data from the memory 6 to allow it to be latched to latching circuits 141 and 142, that is, the latching circuits 141 and 142 in the circuit 18 enables image data which is supplied from the memory 6 to be held, for example, for every four bits (one dot for the image information). The outputs of the latching circuits 141 and 142 are input to the adder 143. The adder 143 is of a binary parallel type and, upon receipt of signals A0 to A3 and B0 to B3, delivers output signals Σ0 to Σ3. In the present embodiment, the signals Σ1 to Σ3 (not Σ0) and carry Cr are employed as outputs. By doing so, an average value of inputs A0 to A3 and inputs B0 to B3 is output, at Σ1 to Σ3 and Cr, from the adder 143 as will be appreciated from FIG. 18.

Stated in more detail, the adder 143, in a normal case, receives, for example, data "0110" (6 in decimal notation) at inputs B0 to B3 and "0100" (4 in decimal notation) at inputs A0 to A3 and delivers [1010] (10 in decimal notation) at outputs Σ0 to Σ3.

As will be appreciated from the above, if an output Cr is used as an uppermost bit in the adder without using Σ0, then an output [0101] (5 in decimal notation) emerges from the adder circuit 143, meaning that it shows a value obtained from dividing a result of addition by 2, that is, an average value is obtained. It is to be noted that an output Cr becomes data [1] when outputs Σ0 to Σ3 exceed [1111] (15 in decimal).

The output data of the adder 143 is held by the latching circuit 144. The held data of the latching circuit 144 and held data of the latching circuits 141 and 142 are supplied to the selector 145. The selector 145 is responsive to a control signal CS from the control circuit 9 to switchingly select, in a predetermined sequence, data items at its inputs A0 to A3, B0 to B3 and C0 to C3 and supply them to a head driver 14.

A video printing apparatus according to the fourth embodiment of the present invention has the following image recording modes: an interpolation enlarging single-image mode, multi-image mode and a composite edit/record mode.

INTERPORATION ENLARGING SINGLE IMAGE MODE

This is a mode for recording a full image area of an input frame on a printing sheet in a manner shown in FIG. 21. In FIG. 21, 150, 50, 51 and 52 denote a printing sheet, frame, image and identification code, respectively. Input image information is processed by a signal processing circuit 2 and A/D converter 3 as shown in FIG. 17 and sent to the memory 6 in which case the processed information is not further processed at the memory circuits 4 and 5. When a coincidence occurs between the horizontal scanning of an original video image and that of a printer, no processing is performed at the converter 17. When both the directions are orthogonal relative to each other, a corresponding processing is carried out at the converter 17 to obtain a coincidence. Then an interpolation processing is conducted, by a processing circuit 18, in an enlarged format. The reason why an interpolation is effected by inserting, between respective data, an average value of their adjacent data is because the number (960 dots) of heat generating elements for a recording head 17 is greater than counterpart data (600 dots) for one line, that is data, being stored as it is in the memory 6, will be recorded at about one half (60×48 mm) the size of a frame 50 (96×72 mm) as shown in FIG. 5. It may be possible to perform an interpolation in an enlarged format with a copied data value simply inserted between original image dots and, preferably, with a calculated average value inserted there to obtain a smoother image quality.

Performing an interpolation in the horizontal line direction will be explained below.

The image information stored in the memory 6 is read out with its leading data first and is supplied to the processing circuit 18. Here let it be assumed that data corresponding to one line of image information is as shown in FIG. 22. Then the leading data [0100] (4) is held in the latching circuit 141 and then data [0110] (6) is held in the latching circuit 142. Thus the data [0100] (4) and [0110] (6) are input to the selector 145 at inputs A0 to A3 and C0 to C3, respectively.

On the other hand, the data [0100] (4) and [0110] (6) are also input to the adder 143 at inputs A0 to A3 and B0 to B3. The adder 143 delivers data [0101] (5) from its outputs Cr and Σ1 to Σ3, noting that the data becomes an average value which is input to the adder 143 at inputs A0 to A3 and B0 to B3. The outputs of the adder 143 are latched to the latching circuit 144, the outputs of which are input to the selector 145 at inputs B0 to B3. The input data of the selector 145 are supplied to the head driver 14 in a sequence of A0 to A3, B0 to B3 and C0 to C3.

When data A0 to A3 are output, third data [1000] (8) as shown in FIG. 22 is input to, and held in, a predetermined location and fourth data [0011] (3) are similarly input to, and held in, a predetermined location. Thus, data [1000] (8), [0011] (3) and [0101] (5) are input to inputs A0 to A3, C0 to C3 and B0 to B3, respectively, of the selector 145. This time, outputs A0 to A3, B0 to B3 and C0 to C3 appear as outputs in that sequence.

Performing an interpolation in a vertical direction will be explained below. It is preferable to perform an interpolation using a calculated average value, but it may be possible to do so with copied previous-line data inserted. In the latter case, the above processing is repeated by, after terminating the interpolation relative to the horizontal scanning line, again designating an address of the position register 7 at a corresponding location with the use of a control circuit 9 and timing signal generator 10. At the termination of a printing operation on an interpolated line, an address is generated to designate the next line. In this way, the same operation is repeated.

Similarly, the aforementioned operation is performed such that, between the dots, an average value of their adjacent data, or copied data, is inserted. By so doing, data items as shown in FIG. 23 are delivered to the head driver 14.

It is thus possible to print an original video image across the whole surface of a printing sheet.

The above is a case where an interpolation is performed in a 1.5-times rate. In an intermediate rate of enlargement, it is possible to perform a simple interpolation either with the use of weighted average data or by the insertion of copied data into a proper location for every n lines (n = an integer).

MULTI-IMAGE MODE

Figure 24:
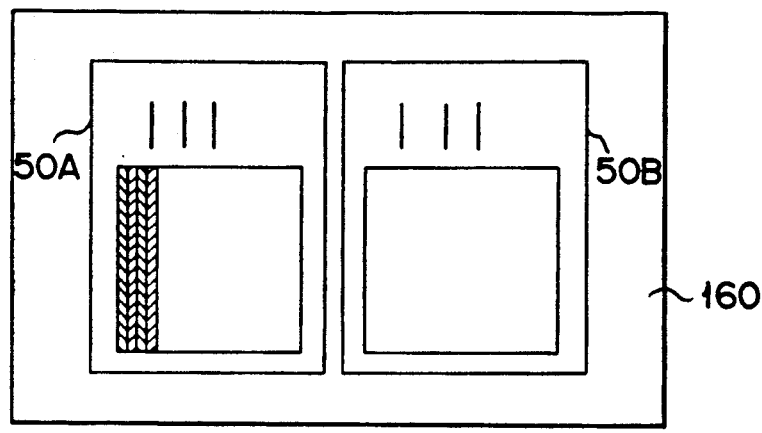

Image data corresponding to one image area in a frame is recorded on a printing sheet 160 in a format shown, for example, in FIG. 24.

In an example shown in FIG. 24, frames 50A, 50B are composed of pixels (600 × 480 dots) and the pixels of the printer are 960 × 720 dots. It is thus possible to print two images on one printing sheet without dropping original image information.

Signals of the frames 50A, 50B which are held in the memories 4 and 5 are rearranged in the vertical and horizontal directions at the vertical/horizontal converter 17 and written at the left and right half areas of the memory 6.

In this case, the number of pixels for a signal written into memory 6 substantially coincides with that of the printing image area. Without being subjected by the processing circuit 18 to an enlarging interpolation process, a signal is sent to the head driver for printout.

It is to be noted that, if the number of pixels of the printing image area of the printer is considerably greater than that of the memory 6 unlike the aforementioned case, it may be possible to perform an enlarging interpolation step by the processing circuit 18.

For the same original image information, it may sometimes be preferable to print it on a smaller image area, without being subjected to an enlarging interpolation, for the purpose for which it is used. In this case it is preferred to use the multi-image edit mode. If, in this case, an image is located in a position 51A only, it may be possible to perform a printing operation on a single sheet with an image 50B empty.

COMPOSITE EDIT RECORDING MODE

Figures 25, 26:
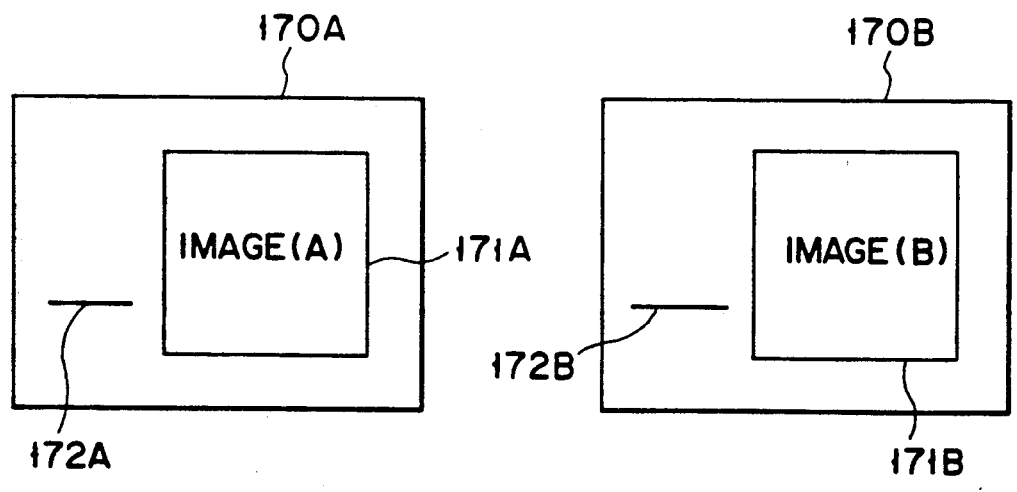

This is a mode in which image data is recorded on a sheet in a manner to extract only an image area in a frame. In the present embodiment, it is possible to obtain a composite image from an image 171A in a frame 170A as shown in FIG. 25 and image 171B in a frame 170B as shown in FIG. 26 where 172A and 172B represent identification codes.

Figure 27:
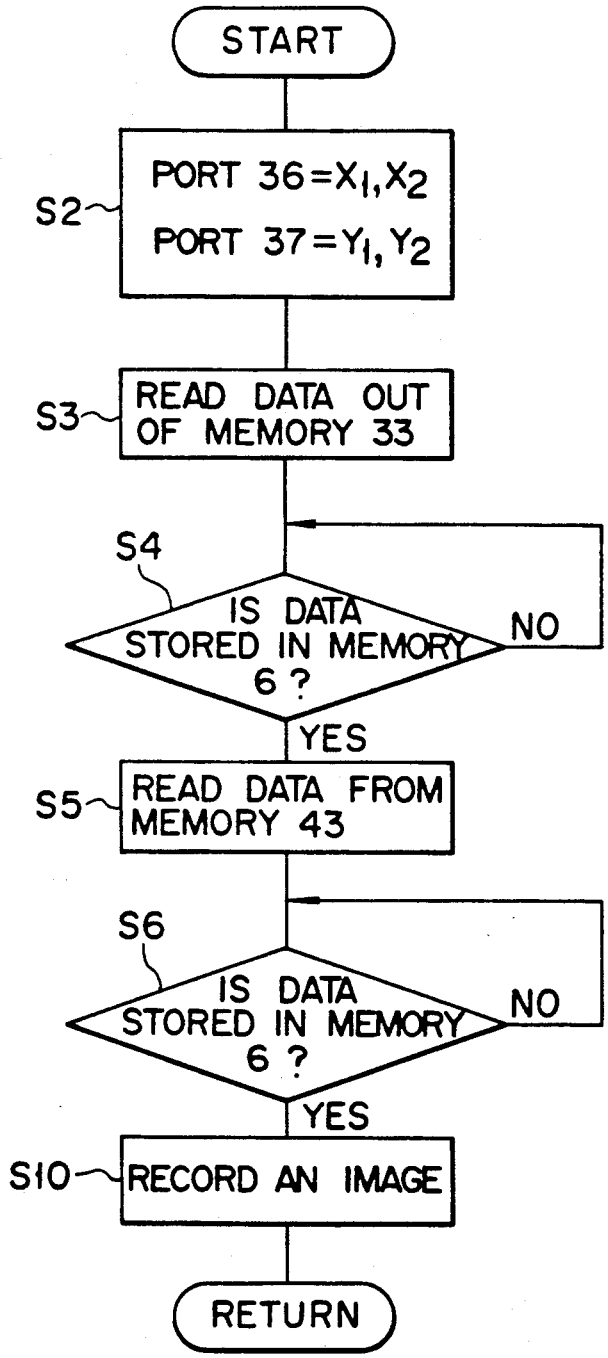

FIG. 27 is a flowchart showing an operation program of a composite recording mode. In FIG. 27, the same reference numerals are employed to designate steps corresponding to those shown in FIG. 11. It is to be noted that image information corresponding to frames 170A and 170B are stored in the memory circuits 33 and 43, respectively.

At step S2, values X1, X2 and values Y1, Y2 are stored in the ports 36 and 37, respectively. The values X1, X2 and Y1, Y2 represent coordinates (values) of images 171A and 171B in a frame.

At step S3, the image information of the frame 170A is read out of the image memory 33 and the image 171A stored in the memory 6 in a developed format. The information corresponding to the image 171A is stored in the memory 6 on a developed format shown, for examples, in FIG. 28, using the position register 7.

At step S4 it is determined whether or not reading of the data from the image memory 33 is completed. If the answer is in the negative, the same routine is repeated. If the answer is in the affirmative, control goes to step S5.

At step S5, the image information corresponding to the frame 170B is read from the image memory 43.

At step S6, the image 171B is stored in the memory 6 in a developed format. The information corresponding to the image 171B is stored in the memory 6 at an area 60 shown, for example, in FIG. 28, using the position register 7. At step 6, it is determined whether or not the reading of the data from the image memory 43 is completed. If the reading step is not completed, the same routine is repeated. If, on the other hand, the reading step is completed, control goes to step S10.

At step S10, the recording of the image is completed, ending an operation.

In the composition edit recording mode like the enlarging interpolation single-image mode, the image can be recorded on the printing sheet 180, while the images 171A and 171B are enlarged, indicated in FIG. 29. Further, as in the multi-image mode, the images 171A and 171B can be recorded on a printing sheet 190 in a not-enlarging format shown in FIG. 30. If printing is made in a not-enlarging format, a 4-, 6-image or more image format can be used for the number of images of the print.

Although the editing of a composite image of different images 171A and 171B has been explained, the present embodiment is not restricted thereto. It is also possible to edit a plurality of identical images as a composite image on a single sheet.

FIG. 31 to 37 are views for explaining advantages gained from the fourth embodiment of the present invention.

Figure 31:
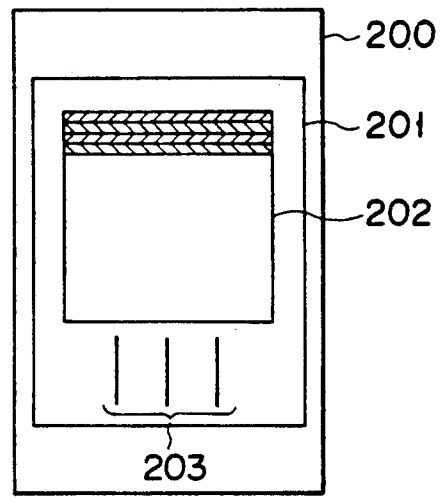

FIG. 31 shows a printing image on a printing sheet. As shown in FIG. 31, an input image signal is printed at an effective printing area 201 on a printing sheet 200 in a format the same as an original video image layout. In FIG. 31, 202 and 203 represent a recording image area and letter/symbol recording area.

Figure 32:
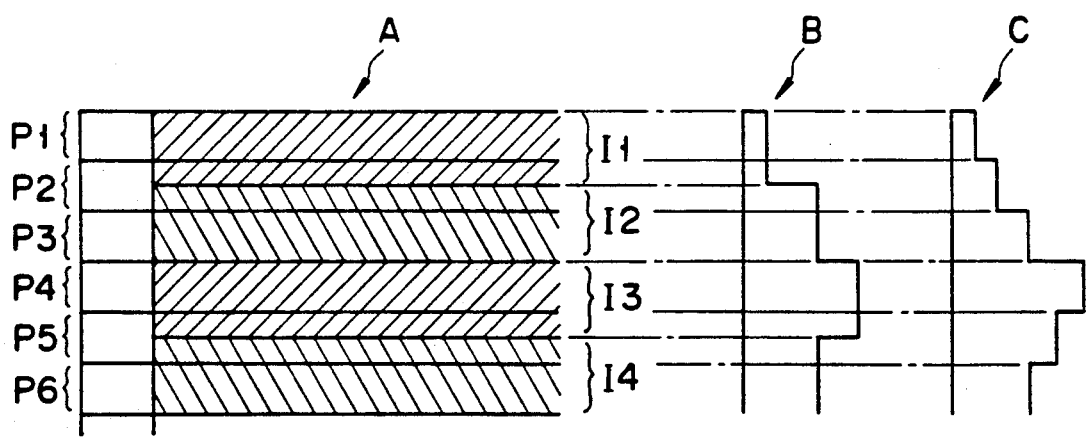

In FIG. 32, A is a view of a comparison, on the printing sheet 200, between an input original video image and the scanning lines of a printer, where I1, I2, ..., I4 show a horizontal scanning line of an input image and P1, P2, ..., P6 show the scanning lines of the printer. In the example shown, the number of scanning lines of the printer is 1.5 times that of an input image.

In FIG. 32, B shows an example for illustrating a density profile, in a vertical scanning direction, of the input original video image corresponding to A in FIG. 32 and C, an example for illustrating a density profile of a corresponding print image. As will be seen from the above, the original video image by indicated by B in FIG. 32 is coarser in the steps of a density variation and hence the scanning lines are unsightedly pronounced whereas a printed image as indicated by C in FIG. 32 is finer in the steps of a density variation and hence the scanning lines vary smoothly. It is thus possible to view a printed image as a very fine one.

FIG. 33 is a view showing a print image obtained by trimming only a dither image area from a plurality of an input original video images and performing an interpolation in an enlarged format r times that of a one image printing. FIG. 33 illustrates an example showing four image areas 213a to 213d, as an edited image, at a 100% enlarging rate. In FIG. 33, 210, 211 and 212 represent a printing paper sheet, effective printing area and recording image area, respectively.

In FIG. 34, A is an enlarged view showing an input original video image and scanning lines for a printing image. I1, I2, ..., I15 show the horizontal scanning lines for the input image and P1, P2, ..., P5 show the scanning lines by the printer. In this example, a coincidence occurs between the number of one scanning line and that of the other scanning line. Thus original image information is obtained without the image being dropped in spite of the fact that a plurality of image areas are printed on a printing sheet.

In FIG. 34, B shows an input original video image and concentration profile, in the vertical direction, of the printing image. As set forth above, the concentration variation is finer in its steps. It is therefore possible to obtain a printing image without original information being dropped.

According to the fourth embodiment, an image corresponding to a dither image area can be printed out, without the dropping of the image information, in the case where an original video image for a plurality of scenes is to be printed on a single printing sheet. Further, in the case as set out above, it is also possible to print out that image at a finer recording density than at a coarser recording density.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A video printing apparatus for printing an edit image obtained by editing an original video image having a half tone image area framed on a predetermined portion of a screen, said video printing apparatus comprising:

a control circuit means for storing coordinates representing the half tone image area of the original video image and coordinates representing a half tone image receiving area of the edit image;

an image edit memory board; and means for selectively switching modes between a normal recording mode wherein an original video image corresponding to one display screen is printed, as is, on a print sheet, and a composite editing mode or recording mode wherein half tone image areas of a plurality of original video images are synthesized, edited and recorded on a print sheet;

editing means for, when the composite editing or recording mode is selected, automatically picking up half tone image areas of original video images on a basis of the coordinates stored in the control circuit means and representing the half tone image area of the original video image and of the coordinates stored in the control circuit means and representing a half tone image receiving area of the edit image;

processing means on the image edit memory board for synthesizing and editing said half tone image areas of the original video images obtained from said editing means to provide an edit image means for printing said edit image; and means for printing said edit image.

2. A video printing apparatus according to claim 1, wherein:

said original video image further includes a letter or symbol image area corresponding to a predetermined portion of the screen;

said control circuit means stores coordinates representing the letter or symbol image area of the original video image and coordinates representing a letter or symbol image receiving area of the edit image;

wherein said editing means, when the composite editing mode or recording mode is selected, automatically picks up the half tone image areas and letter or symbol image areas of the original video images on a basis of the coordinates stored in the control circuit means, and said processing means synthesizes and edits said half tone image areas and said letter or symbol image areas to provide said edit image.

3. A video printing apparatus according to claim 1, wherein:

said control circuit means includes an enlargement processing circuit means for enlarging the original video image in horizontal and vertical scanning directions at a magnification of either R (R > 1) or r (R > r ≧ 1);

when the normal recording mode is selected, said enlargement processing circuit means increases a number of pixels (l×m) constituting the original video image R times in accordance with the magnification R stored in the control circuit means, and said printing means prints an edit image constituted by "L×M" pixels and obtained by automatic conversion; and when the composite editing mode or recording mode is selected, said enlargement processing circuit means receives from the editing means the half tone image areas of a plurality of original video images and produces an enlargement thereof at a magnification of r (R > r ≧ 1), said processing means then automatically synthesizes and edits an output of said editing means with reference to a half tone image receiving area of an image under edition to provide an edit image to said printing means.

4. The video printing apparatus according to claim 3, further comprising:

first printing means for a first mode I for, when one original video image is to be printed on one printing sheet, interpolating said original video image in an R-times enlarging format in the horizontal and vertical directions;

second printing means for a second mode II for, when a plurality of original video images are to be printed on one sheet, editing a plurality of original video images interpolated at an R-times enlarging format in the horizontal and vertical directions and for printing the plurality of original video images;

third printing means for a third mode III for, when a plurality of original video images are to be printed on one printing sheet, trimming only a dither image area from the original video images, for editing trimmed dither image areas into one edited image, for interpolating a number of scanning pixels, for the one edited image, in r-times (r>R) enlarging format and for printing the edited image; and selection means for selecting one of said first, second and third printing means.

* * * * *